(12) United States Patent
Etou (10) Patent No.: US 6,645,668 B2
(45) Date of Patent: Nov. 11, 2003

(54) CLOSED BATTERY MODULE

(76) Inventor: Toyohiko Etou, c/o Toyota Jidosha Kabushiki Kaisha 1, Toyota-cho, Toyota-shi, Aichi-ken, 471-8571 (JP)

( * ) Notice: Subject to any disclaimer, the term of this patent is extended or adjusted under 35 U.S.C. 154(b) by 168 days.

(21) Appl. No.: 09/783,039

(22) Filed: Feb. 15, 2001

(65) Prior Publication Data

US 2001/0014417 A1 Aug. 16, 2001

(30) Foreign Application Priority Data

Feb. 15, 2000 (JP) .................................................. 036381

(51) Int. Cl.$^7$ .................................................. H01M 2/02
(52) U.S. Cl. ........................ 429/153; 429/163; 429/176
(58) Field of Search ............................... 429/163, 176, 429/225, 153

(56) References Cited

U.S. PATENT DOCUMENTS 5,131,559 A * 7/1992 Ariyoshi et al. ............ 220/507

FOREIGN PATENT DOCUMENTS

| DE | 4028585 C1 | 9/1991 | | |
|---|---|---|---|---|
| GB | 1528934 A | 10/1978 | | |
| JP | (P) 07134973 A | 5/1995 | | |
| JP | 07134973 A | * 5/1995 | ............ | H01M/2/02 |
| JP | (P) HEI 10-334874 | 12/1998 | | |

OTHER PUBLICATIONS

Linden, "Handbook of Batteries", 2nd Edition, 1995, pp. 25.5–25.6.*

* cited by examiner

Primary Examiner—Carol Chaney (57) ABSTRACT

Cracking or the like is prevented from being formed in an outer wall of a container of a closed battery module whose internal space is divided by partitions. Each partition dividing the internal space of the container of the closed battery module is provided with a deformable portion that deforms before a stress greater than an allowable value is caused in a container outer wall by load applied to the container. When a load is applied to the module container, the partitions dividing the container internal space restrict deformation of the container outer walls, so that great stress is likely to occur in the outer walls. However, as the deformable portion of a partition deforms due to such load, the stress caused in the container outer walls decreases, so that formation of a crack or the like in the container outer walls becomes less likely.

16 Claims, 10 Drawing Sheets

RELATED ART

CLOSED BATTERY MODULE

INCORPORATION BY REFERENCE

The disclosure of Japanese Patent Application No. 2000-036381 filed on Feb. 15, 2000 including the specification, drawings and abstract is incorporated herein by reference in its entirety.

BACKGROUND OF THE INVENTION

1. Field of the Invention

The invention relates to a structure of a closed secondary battery module.

2. Description of the Related Art

Closed type secondary batteries are widely used as power supplies of various appliances because batteries do not allow leakage of an electrolytic solution, even if they are tilted, and can be used in any placement posture, such as dry batteries. Also widely used are battery modules integrally formed by connecting a plurality of closed secondary batteries so as to meet the power requirements of various appliances.

Such a battery module has a structure in which an internal space of a closed container is divided into a plurality of small cells. Each cell contains an electrolytic solution, a positive electrode plate, and the like. Each cell forms a small secondary battery. The cells are electrically connected in series or parallel. The battery module is provided with a positive terminal and a negative terminal for extracting power.

In some cases, a typical secondary battery experiences a battery internal pressure increase due to generation of a gas at an electrode plate depending on the condition of use or the charging/discharging condition of the battery. Furthermore, in other cases, the closed container receives external force due to, for example, some interference with the battery module. Taking such cases into consideration, an outer wall of the battery module is provided with such a strength that the outer wall will not easily break despite such a load.

However, if the internal pressure of the battery module rises above the withstanding pressure of the closed container, or if the battery module receives a great external force that exceeds an allowable value, there is a danger of formation of a crack or the like in an outer wall of the closed battery container.

SUMMARY OF THE INVENTION

Accordingly, it is an object of the invention to provide a closed battery module capable of avoiding formation of a crack in an outer wall of a closed container of the battery module even if the container receives a load that is greater than an allowable value.

To achieve the aforementioned and other objects, the closed battery module of the invention includes a partition dividing an internal space of a closed container into a plurality of cells, a unit cell formed in each of the cells divided by the partition, and a deformable portion provided in the partition. The deformable portion deforms before a stress greater than a predetermined allowable value occurs in an outer wall of the container by a load applied to the container.

Therefore, the stress occurring in outer walls of the container decreases. Hence, it is possible to avoid occurrence of stress greater than the predetermined allowable value.

The stress greater than the predetermined allowable value may be a stress that does not immediately form a crack in an outer wall but that forms a crack when applied repeatedly. If the stress occurring in the outer walls can be controlled to or below the allowable value, it is possible to prevent cracks or the like that might otherwise be formed in the outer walls.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

The embodiments of the present invention will be described hereinafter with reference to the accompanying drawings.

Figure 1:
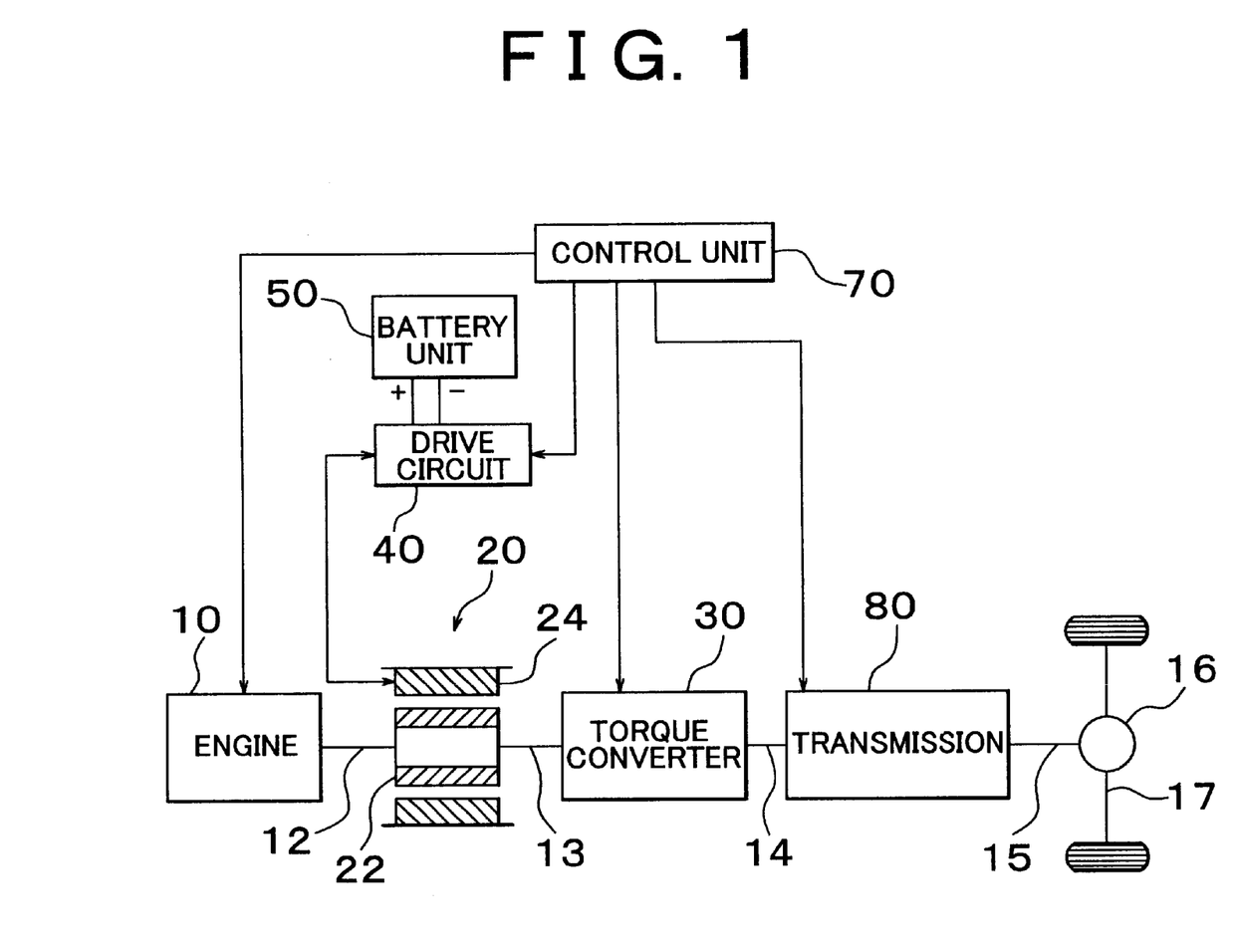
FIG. 1 is a function block diagram illustrating a battery module applied to a hybrid vehicle in accordance with an embodiment of the present invention.

FIG. 1 is a diagram illustrating a construction of a hybrid vehicle equipped with a closed battery module in accordance with a first embodiment of the present invention. The hybrid vehicle is a vehicle having an engine and an electric motor as drive power sources. As shown in FIG. 1, the hybrid vehicle has an engine 10, an electric motor 20, a torque converter 30, a drive circuit 40, a battery unit 50, a control unit 70, and a transmission 80. A closed battery module 100 of this embodiment is used as a component of battery unit 50.

Various elements forming the hybrid vehicle will be briefly described below.

The engine 10 is an ordinary gasoline engine. An output shaft 12 of the engine 10 is connected to a rotor 22 of the motor 20.

The motor 20 is a three-phase synchronous motor having the rotor 22 and a stator 24. A plurality of permanent magnets are provided on an outer peripheral surface of the rotor 22. Three-phase coils for creating rotating fields are wound between teeth provided on an inner peripheral surface of the stator 24. When an alternating current is conducted through the three-phase coils of the stator 24, rotating fields are created. Due to the interaction between the rotating fields and the magnetic fields created by the permanent magnets of the rotor 22, the rotor 22 rotates. By controlling the current value and the frequency of alternating current conducted through the three-phase coils, the drive power and rotating speed of the motor 20 can be controlled. When the rotor 22 is rotated by an external force, electromotive forces are generated in the three-phase coils by interactions between the aforementioned magnetic fields. Thus, the motor 20 also functions as an electric power generator.

The drive circuit 40 is an inverter formed by using a semiconductor element. The drive circuit 40 has a switching function of connecting the terminals of the three-phase coils wound on the stator 24 and a direct-current supply of the battery unit 50 (described below). Under a control by the control unit 70, the drive circuit 40 supplies current to each three-phase coil of the stator 24 while sequentially changing the voltage supplied to each coil, so that rotating fields are created. Thus, the motor 20 is driven. When the rotor 22 is rotated by external force, AC electromotive forces caused in the three-phase coils are converted into DC electromotive forces by the drive circuit 40 sequentially changing the connection between each terminal of the three-phase coils and the battery unit 50. Thus, electric power can be stored into the battery unit 50. The battery unit 50 will be described below.

The control unit 70 is a one-chip microcomputer having a CPU, a RAM, a ROM, and the like. By the CPU executing programs recorded in the ROM, the control unit 70 controls the engine 10, the drive circuit 40, or the like.

The torque converter 30 is a drive power transmitting mechanism that utilizes a liquid. An input shaft 13 of the torque converter 30 is connected to the rotor 22 of the motor 20. The torque converter 30 is tightly closed. A transmission oil is contained in the torque converter 30 in a sealed manner. A turbine having a plurality of blades is provided at an end of each of the input shaft 13 and an output shaft 14 of the torque converter 30. The turbines are provided inside the torque converter 30 in such a manner that the input shaft 13-side turbine and the output shaft 14-side turbine face each other. When the input shaft 13 turns, torque is transmitted from the input shaft 13-side turbine to the output shaft 14-side turbine via the transmission oil, so that torque is outputted from the output shaft 14 to the transmission 80.

The transmission 80 is a well-known automatic transmission formed by a planetary gear mechanism, a plurality of clutches, and the like. The transmission 80 is designed so that if the clutch engagement state is changed, the planetary gear unit changes the speed ratio between an input shaft and an output shaft 15 of the transmission 80. The operation of each clutch is controlled by the control unit 70. The output shaft 15 of the transmission 80 is connected to an axel 17 via a differential gear 16.

In the hybrid vehicle constructed as described above, drive power outputted from the engine 10 or the motor 20 is transmitted to the transmission 80 via the torque converter 30. After speed increase or speed reduction is caused by the transmission 80, drive power is transmitted to the axel 17, thereby driving the vehicle. By selectively using the two drive power sources, the engine 10 and the motor 20, in accordance with the driving condition of the vehicle, the hybrid vehicle achieves improved energy efficiency as a whole. For example, during braking of the vehicle, the motor 20 is caused to function as a generator to convert kinetic energy of the vehicle into electric energy, which is stored into the battery unit 50. When a great output is needed, for example, during acceleration of the vehicle, the motor 20 covers a shortfall of the output of the engine 10. By effectively using the motor 20, it becomes possible to operate the engine 10 in a increased fuel efficiency condition. The energy efficiency of the whole hybrid vehicle may be improved.

Figure 2:
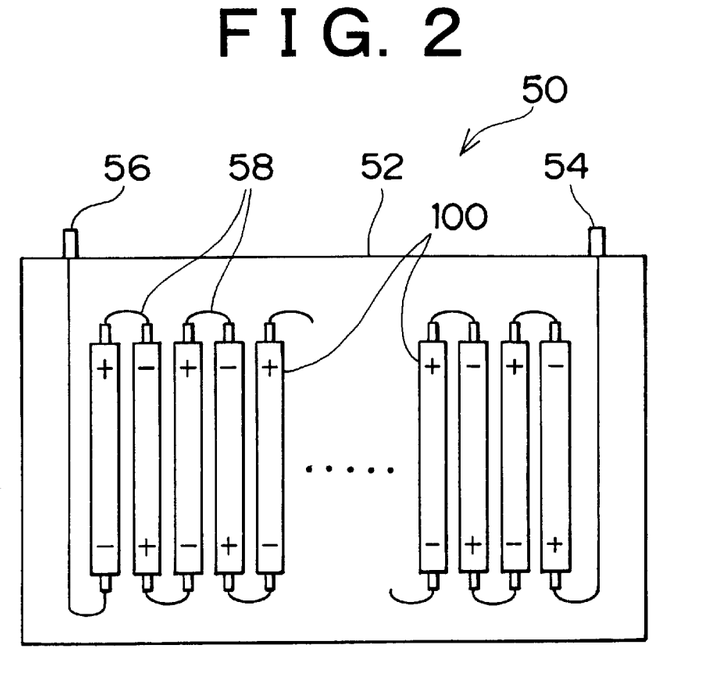
FIG. 2 is a conceptual diagram illustrating a structure of a battery unit formed by using battery modules in accordance with an embodiment of the present invention.
Figure 3:
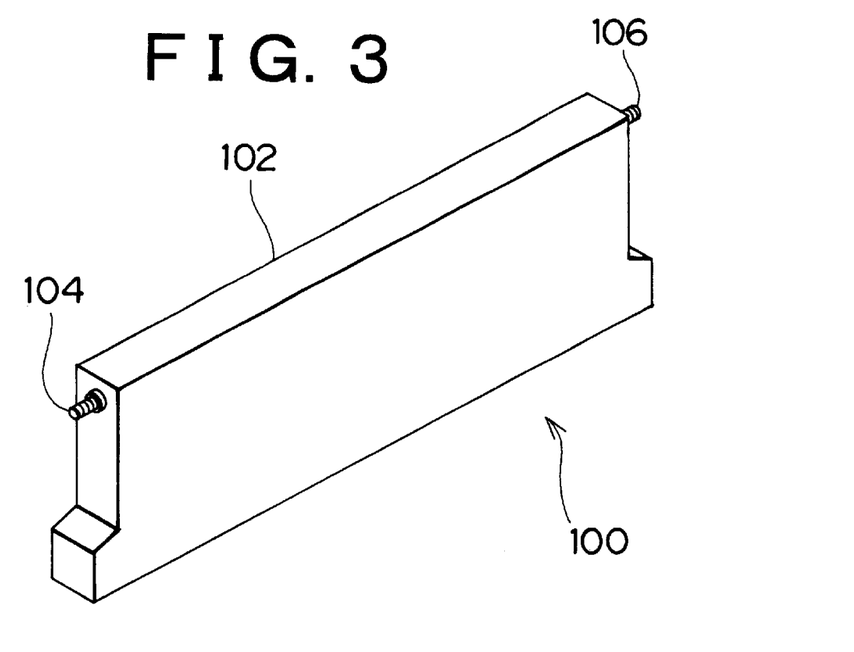
FIG. 3 is a diagram exemplifying an external configuration of a battery module in accordance with an embodiment of the present invention.

FIG. 2 is a conceptual diagram illustrating a structure of the battery unit 50. The battery unit 50 has a structure in which a plurality of closed type battery modules 100 are contained in a case 52. FIG. 3 illustrates an external configuration of a closed battery module 100. The closed battery module 100 of the embodiment has a configuration in which two terminals, that is, a positive electrode terminal 104 and a negative electrode terminal 106, protrude from a module container 102 that has a thin box-like shape. In this embodiment, thirty-eight (38) closed battery modules 100, as shown in FIG. 3, are contained in the case 52 of the battery unit 50. The closed battery modules 100 are connected to one another in series by electric wires 58, and are connected to a positive electrode-side output terminal 54 and a negative electrode-side output terminal 56 of the battery unit 50. By combining a plurality of battery modules in this manner, the battery unit 50 having may have voltage and current values.

Each closed battery module 100 generates Joule heat due to internal resistance during discharging or charging. Therefore, to allow dissipation of Joule heat, the battery modules are disposed at fixed intervals.

Figure 4:
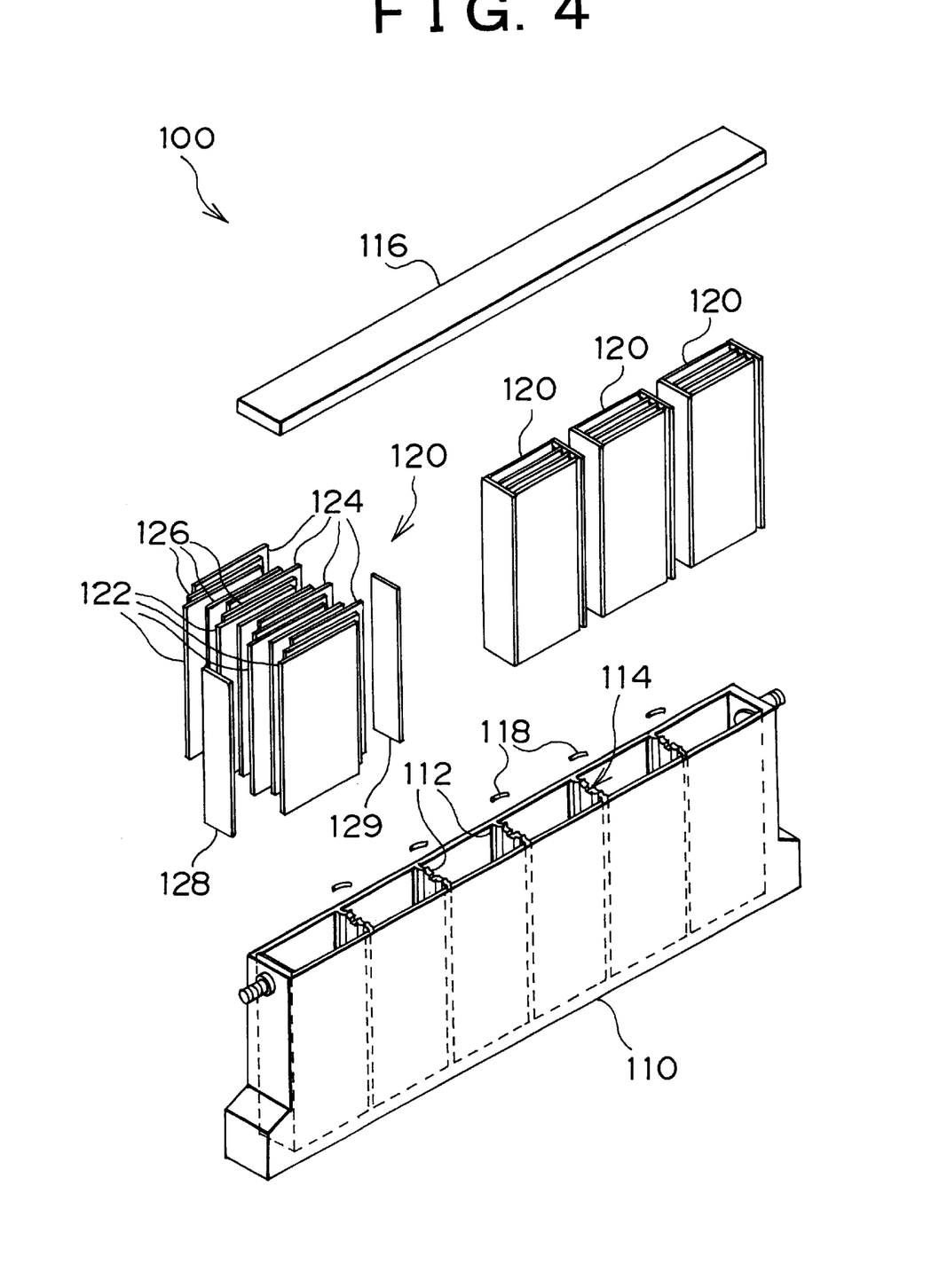
FIG. 4 is an exploded assembly diagram illustrating a structure of a battery module in accordance with an embodiment of the invention.

FIG. 4 is a diagram illustrating a structure of the closed battery module 100. The closed battery module 100 has a structure in which a plurality of unit electric cells 120 are contained in a lower case 110, and are enclosed by an upper plate 116. An inner space of the lower case 110 is divided into a plurality of small cells. Each cell contains one unit electric cell 120. In the example shown in FIG. 4, the lower case 110 is divided into six cells. A total of six unit electric cells 120 are contained in the cells. The lower case 110 is formed from a highly insulative resin material.

Each unit electric cell 120 is formed by alternately stacking pairs of a positive electrode 122 and a separator 126, and pairs of a negative electrode 124 and a separator 126. The positive electrodes 122 are welded at one end side thereof to a positive electrode plate 128. The negative electrodes 124 are welded at one end side thereof to a negative electrode plate 129. When the thus-formed unit electric cell 120 is contained together with an electrolytic solution within a cell, electromotive force is generated between the positive electrode plate 128 and the negative electrode plate 129. The separators 126 are formed from a paper or a resin-made non-woven cloth having good gas permeability. A separator 126 is disposed between each pair of adjacent electrodes so as to prevent electric contact between the positive electrode 122 and the negative electrode 124.

Each unit electric cell 120 of this embodiment is comprised of nickel-hydrogen secondary cell. The material of the positive electrodes 122 is a nickel-based alloy. The material of the negative electrodes 124 is a hydrogen storage alloy. As the electrolytic solution, a strong alkali solution is used. The claimed embodiment is not limited to the nickel-hydrogen secondary batteries, but is applicable to any closed battery module.

After the unit electric cells 120 are contained in the corresponding cells of the lower case 110, the positive electrode plate 128 and the negative electrode plate 129 of every two adjacent unit electric cells 120 are interconnected by an electrically conductive member 118, such as a conductive wire. Each one of partitions 112 separating the cells has in its upper portion a cutout for passing an electrically conductive member 118. After the six unit cells are electrically connected, the positive electrode plate 128 and the negative electrode plate 129 of the opposite end-side unit electric cells are welded to the positive electrode terminal 104 and the negative electrode terminal 106 of the closed battery module 100, respectively. After each cell is filled with the electrolytic solution, the upper plate 116 is placed and adhered to the lower case 110, thereby completing the closed battery module 100.

After the lower case 110 is adhered to the upper plate 116, the closed battery module 100 having the above-described structure prevents leakage of the electrolytic solution contained therein even if the module 100 is tilted. In this embodiment, six nickel-hydrogen cells, each producing an electromotive force of 1.2 V, are connected in series, and, therefore, one closed battery module 100 produces a power of 7.2 V.

When the closed battery module 100 discharges power, Joule heat is generated due to the internal resistance of the closed battery module 100. Joule heat is also generated due to the internal resistance when the closed battery module 100 is charged. The closed battery module 100 has a thin flat shape as shown in FIGS. 3 and 4, that is, has a large surface area relative to its volume. Therefore, Joule heat can be efficiently released.

When a secondary battery is over-charged or over-discharged, the electrolytic solution is electrolyzed so that a gas is produced on an electrode. In the case of a nickel-hydrogen secondary battery, oxygen gas is produced from the positive electrode plate side during the over-charged state, and hydrogen gas is generated from the positive electrode plate side during the over-discharged state, so that the internal pressure on the closed battery module 100 temporarily rises. The lower case 110 and the upper plate 116 of the closed battery module 100 are formed with a strength that withstands such a pressure rise.

Figure 5:
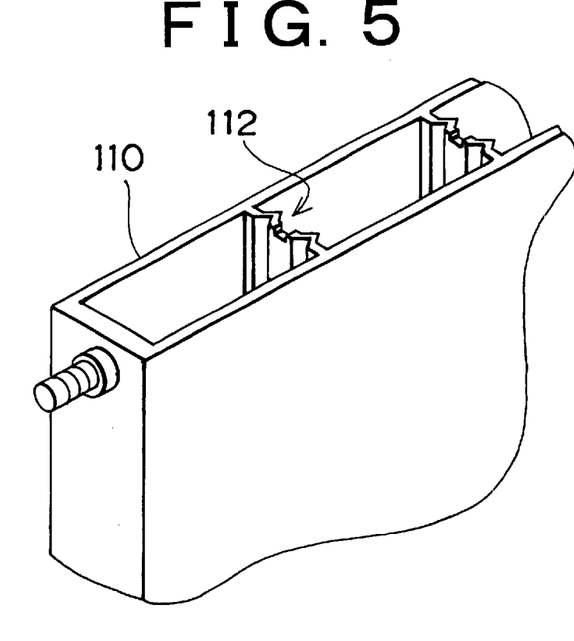
FIG. 5 is a diagram illustrating a configuration of partitions of a battery module in accordance with a first embodiment of the present invention.
Figure 6:
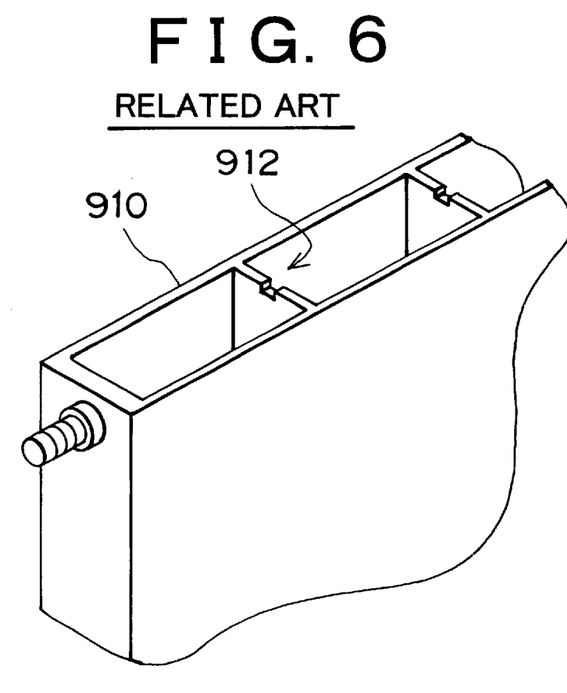
FIG. 6 is a diagram illustrating a configuration of partitions of a battery module for comparison with the first embodiment.

FIG. 5 is an enlarged fragmentary view of the lower case 110 used in the closed battery module 100. As shown in FIG. 5, each of the partitions 112 dividing the internal space of the lower case 110 has a folding screen-like shape is formed by bending a flat plate. For comparison, FIG. 6 shows an enlarged view of a lower case 910 in which partitions and container outer walls have approximately equal thicknesses.

Figure 7A:
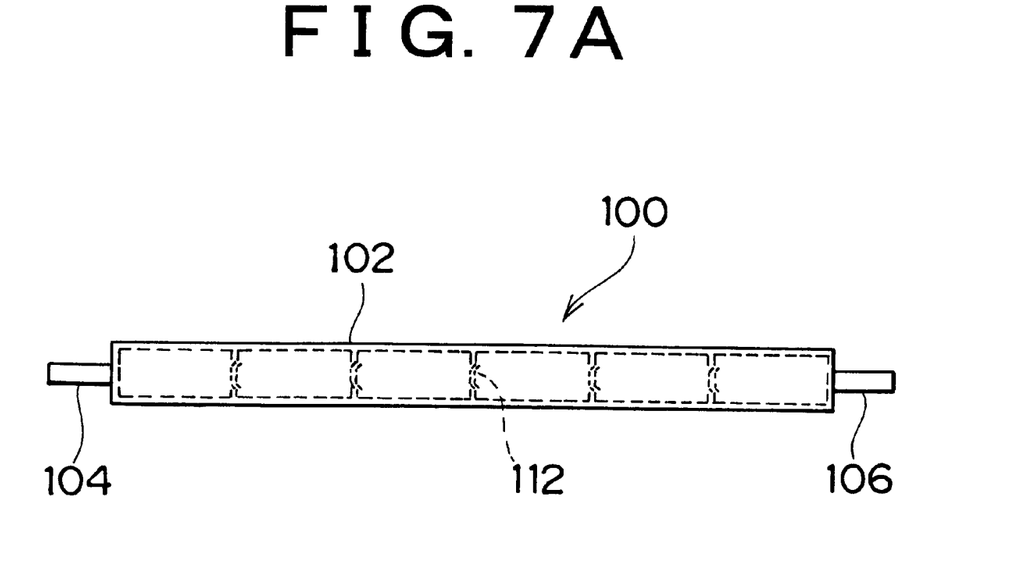
FIGS. 7A and 7B are diagrams illustrating a state where the module internal pressure of the battery module abnormally increases in accordance with the first embodiment.

The closed battery module 100, having a partition configuration as shown in FIG. 5, is able to prevent formation of a crack or the like in a container outer wall even if the internal pressure on the module container 102 abnormally rises, for the following reasons. FIG. 7A is a diagram showing a view of the lower case 110 as described above. In FIG. 7A, broken lines indicate that the internal space of the module container 102 is divided into six cells by the partitions 112. When the closed battery module 100 enters the over-charged state or the over-discharged state, a gas is produced from the positive electrode plate. Although the cells are separated from one another by the partitions 112, each partition 112 has in its upper portion the cutout 114 for a connection between the electrode plates of the adjacent cells. Therefore, the internal pressure in the cells equally rises. The module container 102 is formed so as to withstand a predetermined internal pressure rise. Therefore, if the amount of pressure rise is small, the module container 102 does not significantly deform.

Figure 7B:
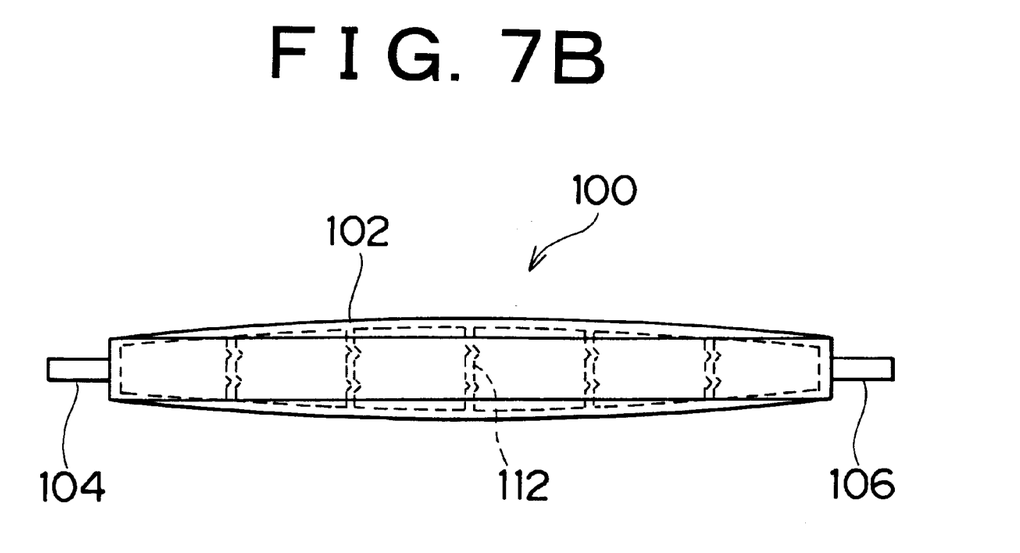

FIG. 7B is a diagram illustrating a state where the internal pressure on the closed battery module 100 rises because of, for example, continuation of the over-charged state or the over-discharged state for a long time due to the driving condition of the vehicle. When the internal pressure on the closed battery module 100 rises, walls of the module container 102 receive large loads, so that the partitions 112 elastically deform as indicated in FIG. 7B, and, therefore, the side walls of the module container 102 expand outwards. As such deformation progresses, the capacity of the module container 102 increases and, correspondingly, the container internal pressure decreases. As a result, the force needed for deformation of the container and the container internal pressure becomes balanced.

Figure 8:
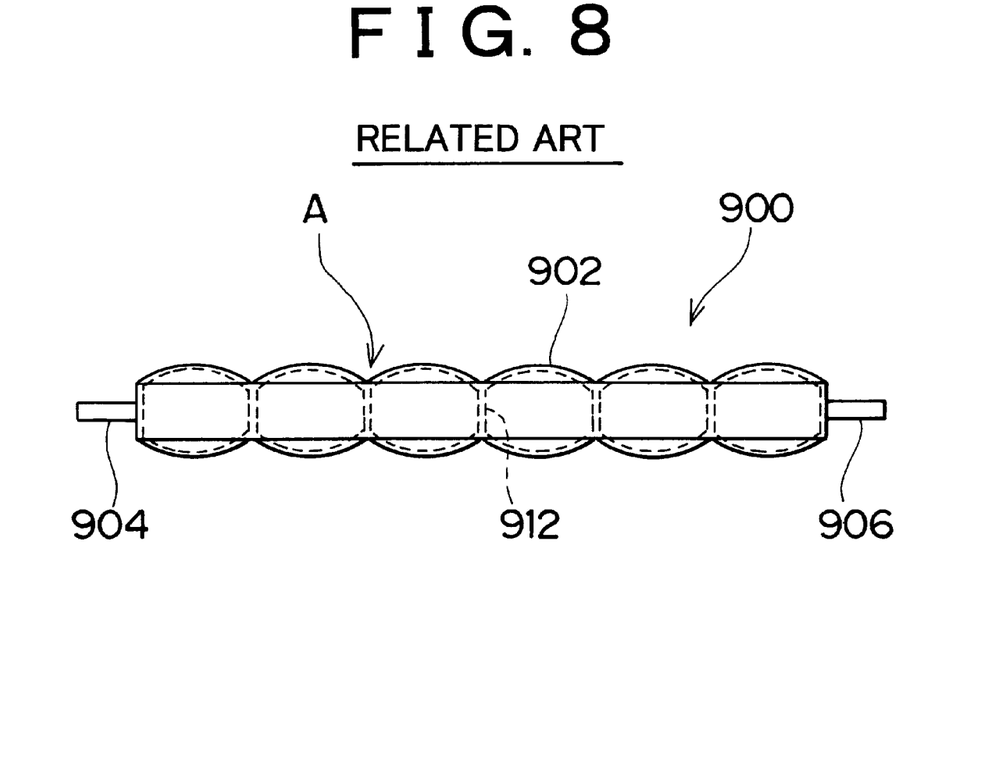
FIG. 8 is a diagram illustrating a state where the module internal pressure of a battery module abnormally increases in accordance with a related art.

FIG. 8 illustrates a state where a rise occurs in the internal pressure on a battery module 900 provided with partitions 912 and container walls of approximately equal thicknesses. Because the partitions 912 and the container walls have approximately equal thicknesses, deformation of the walls is impeded. As a result, a module container 902 deforms into a shape where the module container is constricted at portions adjacent to the partitions 912. That is, even though opposite ends of each partition wall 912 having a flat plate shape receive such loads as to extend the partition, the walls formed from the same resin material as that of the lower case body do not substantially elongate. Therefore, the wall faces of the module container 902 are restrained at partition portions, and deform into a shape as shown in FIG. 8. Because the walls of the module container 902 are restrained at the partition portions as mentioned above, the increase in the capacity is small and the reduction in the container internal pressure caused by deformation of the walls is small although the container wall faces expand outwards to some extent. Therefore, the container walls deform in such a manner that the container wall faces further expand outwards. When the container walls deform in this manner, bending deformations occur in portions at and around junctions between the container walls and the partitions, and high stresses occur in these portions. Furthermore, as the flexural rigidity sharply changes at or around the junctions between the partitions 912 and the walls of the module container 902, stress concentration occurs at or around the junctions. If the stress locally occurring in the container walls exceeds an allowable stress of the lower case material, there is a danger of formation of a crack in the module container 902.

In contrast, the partitions 112 of the present invention have a shape as is formed by bending a flat plate as show in FIG. 5. Therefore, upon receiving a certain load in such a direction as to extend the partitions 112, the partitions 112 elongate. As a result, the module container 102 deforms into a shape where the container is expanded altogether without substantial constrictions at the partitions, as shown in FIG. 7B. As is apparent from comparison between FIG. 7B and FIG. 8, the walls of the module container do not have great bending deformation when the module container is in a shape as shown in FIG. 7B, that is, a shape where the container is expanded altogether without substantial constrictions at the partitions. Therefore, the module container 102 avoids the danger of formation of a crack or the like.

While the foregoing description is made in conjunction with a case where the internal pressure on the battery module increases, the battery module 100 of the first embodiment is able to avoid an event that a crack or the like is formed in the module container 102, not only in the aforementioned case but also in other cases, such as the case where the closed battery module 100 receives an external load.

Figure 9:
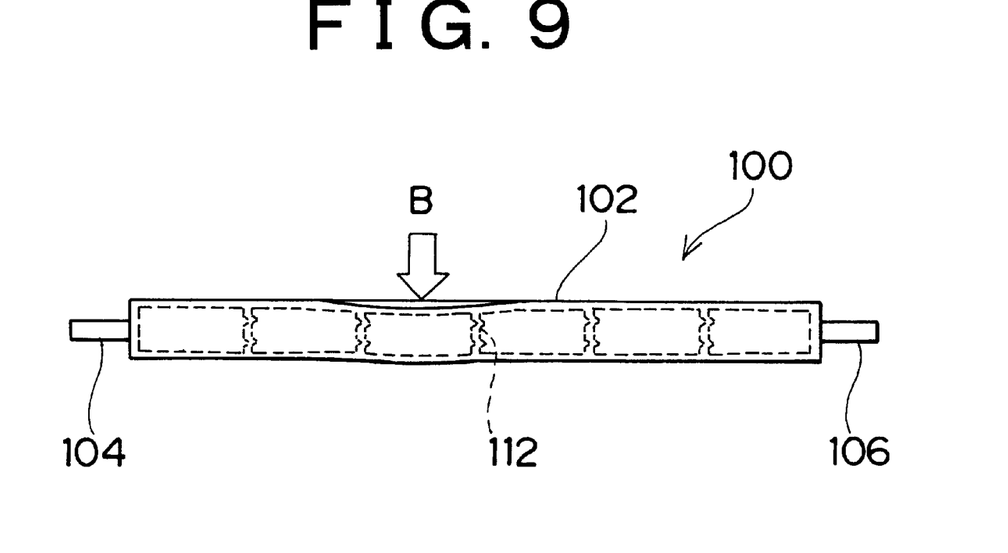
FIG. 9 is a diagram illustrating a state where a module container of the battery module of the first embodiment receives a outside load.
Figure 10:
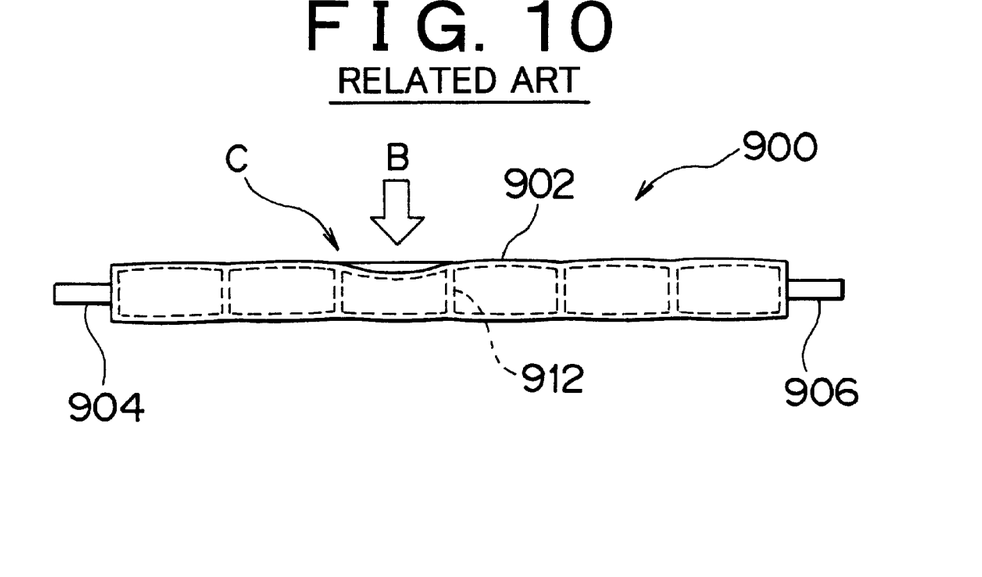
FIG. 10 is a diagram illustrating a state where a module container of a battery module in accordance with a related art receives a outside load.

FIG. 9 is a diagram illustrating a state where the module container 102 deforms when the battery module 100 interferes with an external member so that a wall surface of the module container 102 receives a outside load. FIG. 10 is a diagram illustrating a state where the battery module 900 having partitions that are approximately as thick as the container walls receives a outside load.

In FIG. 10, a load acting from outside is indicated by an arrow B. When a load acts on the container module 902 from outside, the load acts on partitions 912 in such a direction as to compress the partitions from outside. However, the partitions, formed from the same resin material as that of the lower case body, barely compress. Therefore, the wall of the module container 902 deforms so that a portion at and around the point of receiving the load becomes greatly dented. As the container wall deforms into such a shape, the wall receives, at a portion indicated by C in FIG. 10, a bending deformation. As a result, there is a danger of formation of a crack or the like in this portion of the module container 902.

In contrast, the partitions 112 in the claimed embodiment have a shape formed by bending a flat plate as shown in FIG. 5, so that with a certain load, the partitions 112 can become compressed. That is, upon receiving a load as indicated by an arrow B in FIG. 9, partitions 112 near the point of load deform in a contracting manner. As a result, a area of the wall of the module container 102 deforms as indicated in FIG. 9. Comparing FIG. 9 and FIG. 10, the container wall does not undergo a great deformation if the module container deforms as indicated in FIG. 9, and deforms so that a broad area of the container wall becomes dented. Therefore, formation of a crack or the like is less likely in the module container 102.

The foregoing description is made in conjunction with the case where the partitions 112 have a shape as is formed by folding a flat plate and where when the module container receives an external force, partitions elastically deform so that folded portions bend. However, it is not necessary that the folded portions elastically deform, but folded portions may plastically deform. For example, it is possible to adopt a construction in which partitions break at folded portions when the module container receives a predetermined external force. As partitions break at folded portions by a load, the stress occurring in a wall of the module container decreases. Therefore, formation of a crack or the like in the container walls can be avoided.

Figure 11:
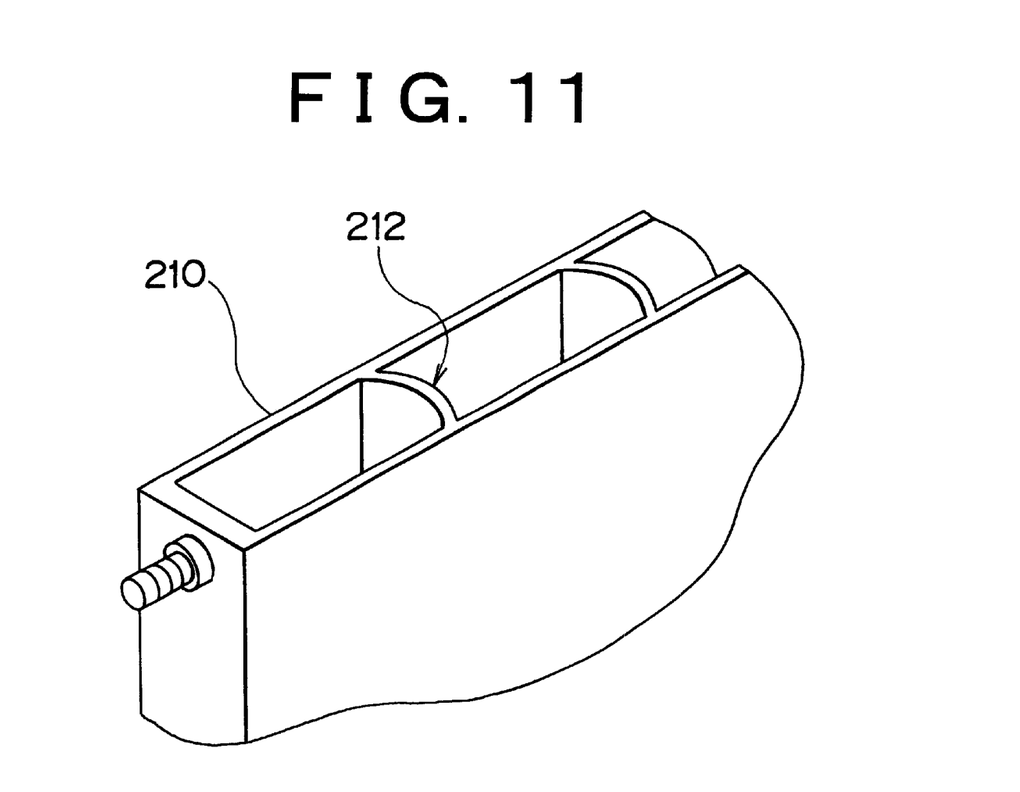
FIG. 11 is a diagram showing a modification the partition configuration of the battery module in accordance with the first embodiment.

Furthermore, although in the battery module 100, the partitions 112 have a shape as is formed by folding a flat plate, the partitions are not limited to the shape shown in FIG. 5, but may have any shape as long as the shape allows the partitions to deform in an expandable and contactable manner in accordance with the load from outside. For example, partitions 212 having a curved shape as shown in FIG. 11 are also possible. Furthermore, the partitions may have a shape where curvature is partially provided. If a module container is formed by using a lower case 210 provided with the partitions 212 having the aforementioned shape, it is possible to avoid formation of a crack or the like in the container outer walls even if an external force acts on the module container.

Figure 12:
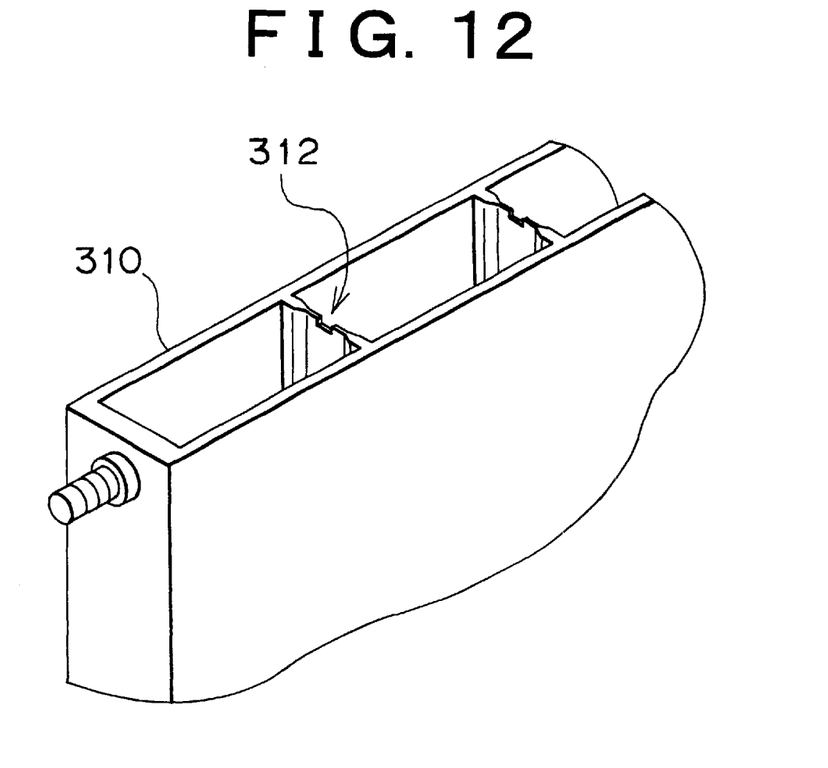
FIG. 12 is a diagram illustrating a partition configuration of a battery module in accordance with a second embodiment of the present invention.

FIG. 12 is an enlarged fragmentary view of a lower case 310 used in a battery module 300 of the second embodiment. The battery module 300 of the second embodiment is applied to a hybrid system as indicated in FIG. 1. As shown in FIG. 12, each of partitions 312 dividing an internal space of the lower case 310 has a central portion that is reduced in wall thickness.

Figure 13:
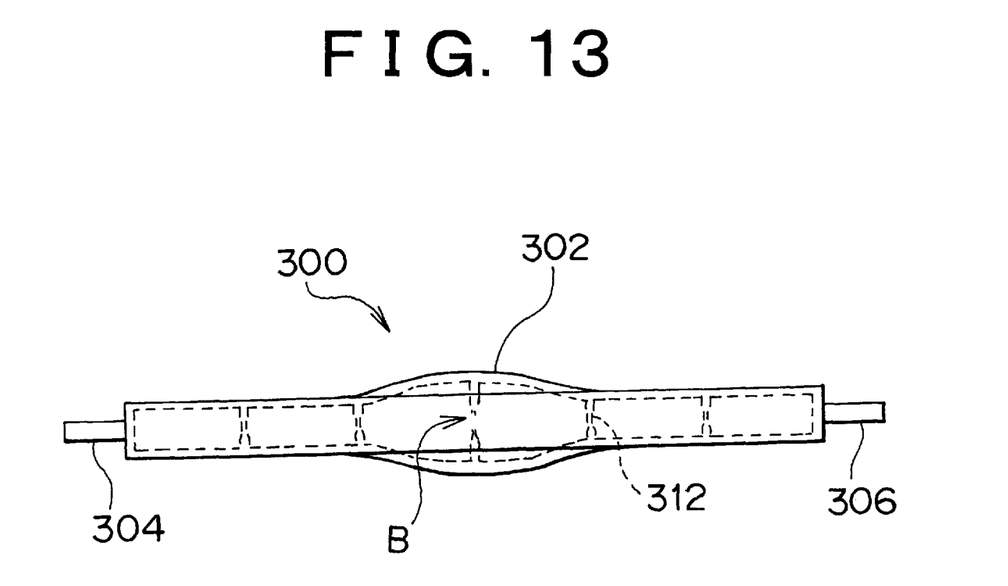
FIG. 13 is a diagram illustrating a state where the module internal pressure of the battery module abnormally increases in accordance with the second embodiment.

The battery module 300 of the second embodiment is provided with partitions having a configuration as shown in FIG. 12. This configuration makes it less likely that a crack will be formed in an outer wall of a module container 302 even when the internal pressure on the module container 302 abnormally rises. FIG. 13 is a diagram showing a view of the battery module 300 taken from above. When the battery module 300 enters an over-charged state or an over-discharged state, a gas is produced at a positive electrode plate, so that the internal pressure on the module container 302 increases. If the amount of pressure increase is small, the module container 302 of the second embodiment barely deforms.

If the internal pressure on the battery module 300 increases, for example, for the reason that the over-charged state or the over-discharged state of the battery module 300 continues for a long time due to a driving condition of the vehicle, walls faces of the module container 302 receive great loads, and, therefore, partitions 312 receive strong tensile loads. Because the partitions 312 are formed from the same material as that of the lower case 310, the partitions 312 barely elongate when receiving tensile load. Thus, the walls face of the lower case 310 are restrained by the partitions 312. That is, as the internal pressure on the battery module 300 increases, the outer walls of the module container 302 deform into a shape where portions of the outer walls adjacent to partitions are constricted as shown in FIG. 8. It should be noted herein that each partition 312 of the module container 302 of the second embodiment has a reduced-wall thickness portion. Therefore, when the container internal pressure further rises, the reduced-wall thickness portion of a partition 312 breaks before a crack is formed in a container wall face. FIG. 13 is a diagram illustrating a state where a partition 312 has broken at a portion indicated by an arrow B. When a partition 312 breaks as shown in FIG. 13, portions of the wall of the container adjacent to the broken partition are released from restraint, and are allowed to deform in such a manner as to expand outwards. Therefore, capacity increases, and the container internal pressure decreases. As a result, the value of stress occurring in the container wall faces decreases, thereby avoiding formation of a crack.

The breakage of the partition 312 brings about a state where the electrolytic solution is allowed to flow back and forth between the adjacent cells. In this state, the adjacent cells function just like a single cell, so that the electromotive force generated by the battery module 300 as a whole decreases. That is, a battery module 300 having a broken partition can be detected by measuring the terminal voltage of the battery module 300.

Figure 14:
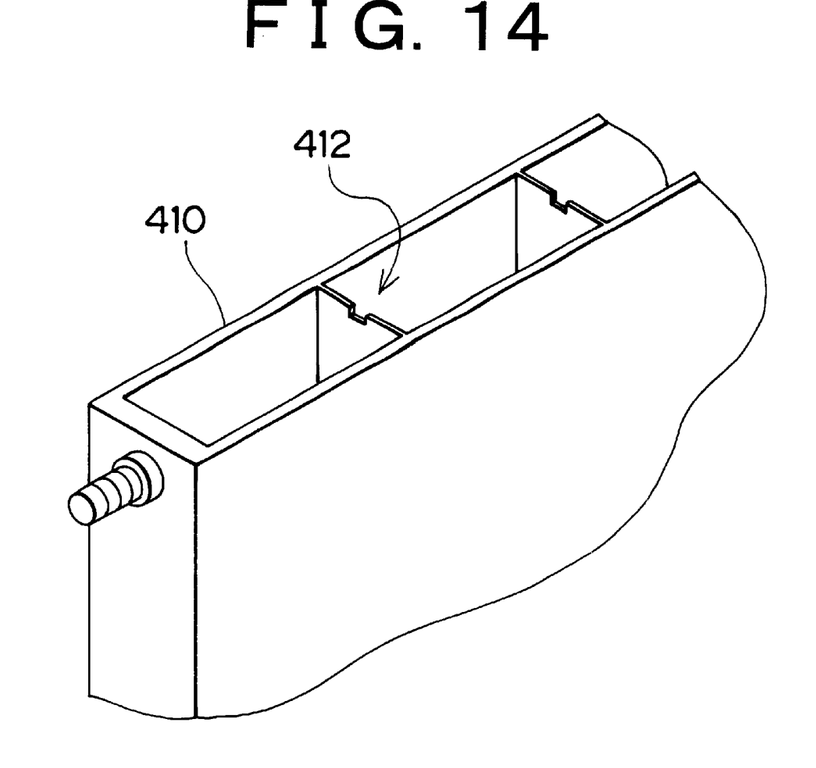
FIG. 14 is a diagram illustrating a modification of the partition configuration of the battery module in accordance with the second embodiment.

Although in the above-described battery module 300 of the second embodiment, each partition 312 has a reduced-wall thickness portion, the partitions do not need to have the configuration shown in FIG. 12. The partitions may have any configuration as long as the partitions are breakable before a crack is formed in the module container outer walls. For example, it is also possible to adopt partitions 412 which are made thinner as indicated in FIG. 14.

The invention may be carried out in various modes without departing from the sprit of the invention.

Figure 15:
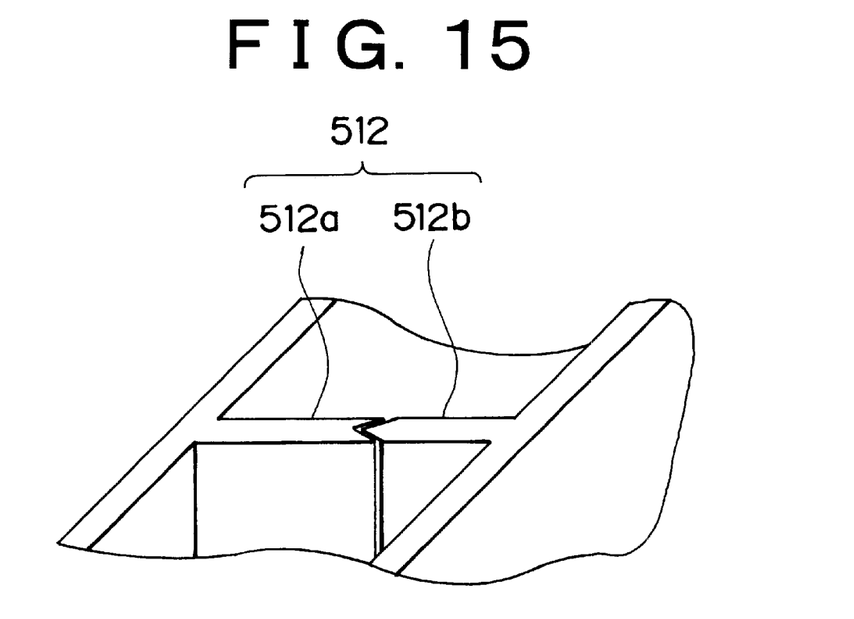
FIG. 15 is a diagram illustrating a partition configuration of a battery module in accordance with a third embodiment of the present invention.
Figure 16:
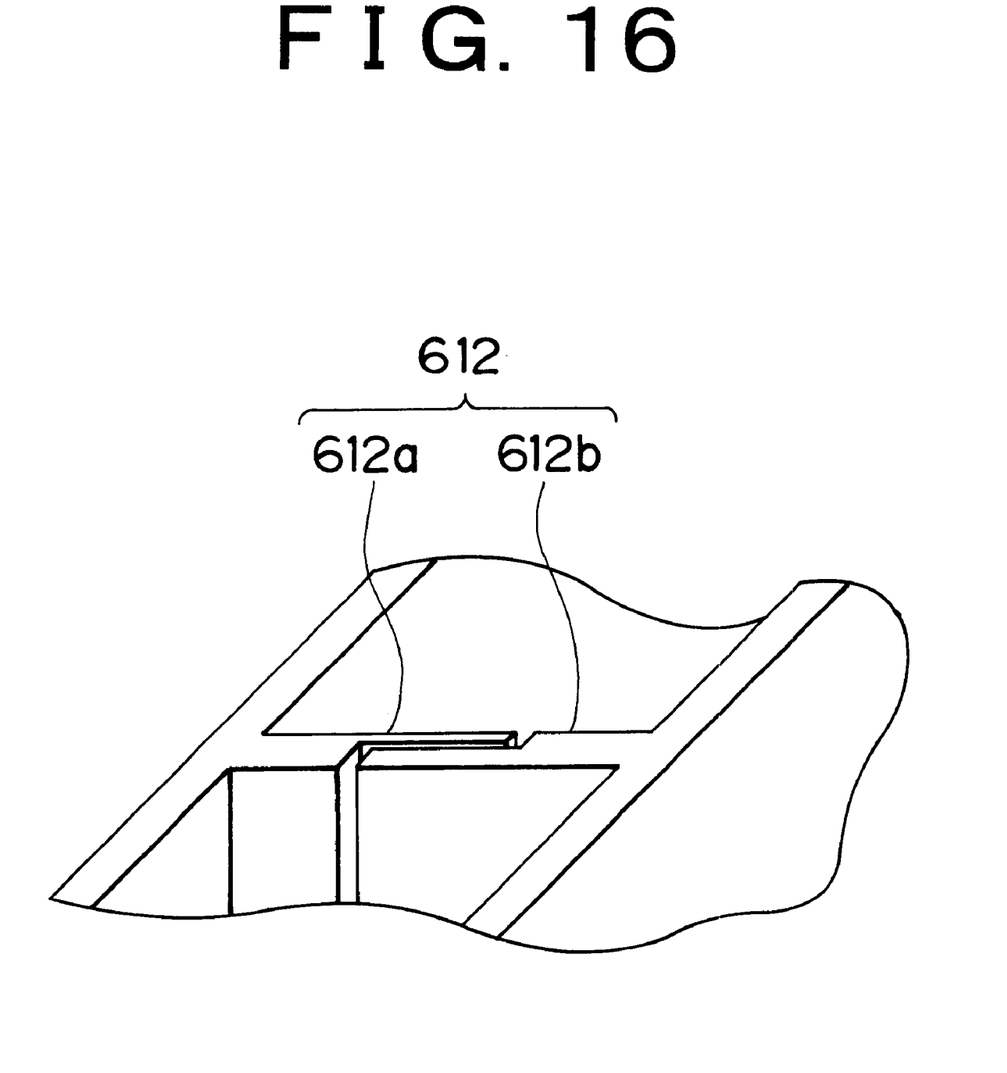
FIG. 16 is a diagram illustrating a partition configuration of a battery module in accordance with the third embodiment of the present invention.

For example, each partition may be formed by combining two protrusion-like members as shown in FIG. 15 or 16. More specifically, as shown in FIG. 15, a protrusion 512a is provided on one of the walls of the module container, and another protrusion 512b is protruded from the opposite wall so as to face the protrusion 512a. The two protrusions 512a, and 512b form a partition 512. The two protrusions 512a, and 512b are placed in tight contact with each other so as to prevent the electrolytic solution from passing through a gap between the protrusions. It is also possible to form each partition as shown in FIG. 16, where a protrusion 612a is protruded from a wall of the module container, and another protrusion 612b is protruded from the opposite wall, and the partition 612 is formed by the two protrusions 612a, and 612b. In this construction, the two protrusions 612a, and 612b are placed in tight contact with each other so as to prevent passage of the electrolytic solution via a gap between the protrusions.

In a battery module having partitions as shown in FIG. 15 or 16, the cells are separated from one another by the partitions 512 or 612, each formed by two protrusion-like members while the internal pressure on the module container is not very high. Therefore, during such a state, the battery module is able to generate, between the two terminals, an electromotive force corresponding to the number of cells. When the internal pressure on the module container rises to a certain level, the entire container wall faces deformation because the partitions 512 or the partitions 612 do not restrain the container walls. Thus, reduced stress occurs in the walls of the module container, so that there is no danger of formation of a crack or the like in the container wall.

Furthermore, the battery module having partitions as shown in FIG. 16 is able to avoid formation of a crack or the like in the module container when a load is applied from outside. That is, each partition 612 as shown in FIG. 16 is deformable in the compressing direction in response to load in such a direction as to contract the partition. The partitions 612 do not restrain the container wall a when load is applied from outside. As a result, the partitions 612 allow deformation of broad areas of the walls of the module container. Therefore, no great stress occurs locally in a wall of the module container, so that formation of a crack in the container can be avoided.

While the invention has been described with reference to what are presently considered to be preferred embodiments thereof, it is to be understood that the invention is not limited to the disclosed embodiments or constructions. On the contrary, the invention is intended to cover various modifications and equivalent arrangements.

What is claimed is:

1. A closed type battery module comprising:
    a partition dividing an internal space of a closed container into a plurality of cells;
    a unit cell formed from the plurality of cells divided by the partition; and
    a deformable central portion that is provided in the partition and that deforms before a stress greater than a predetermined allowable value occurs in an outer wall of the container by a load applied to the container, and which is more deformable than other portions of the partition.

2. A battery module according to claim 1, wherein the unit cell is a secondary battery.

3. A battery module according to claim 1, wherein the deformable portion is a member that is plastically deformable by the load.

4. A battery module according to claim 1, wherein the deformable portion is a member that is elastically deformable by the load.

5. A battery module according to claim 1, wherein the deformable portion is a member whose strength is set so that the member breaks before the stress occurring in the outer wall of the container exceeds the predetermined allowable value.

6. A battery module according to claim 1, wherein the predetermined allowable value of the stress corresponds to a stress that breaks the outer wall of the container.

7. A battery module according to claim 2, wherein the predetermined allowable value of the stress corresponds to a stress that breaks the outer wall of the container.

8. A battery module according to claim 3, wherein the predetermined allowable value of the stress corresponds to a stress that breaks the outer wall of the container.

9. A battery module according to claim 4, wherein the predetermined allowable value of the stress corresponds to a stress that breaks the outer wall of the container.

10. A battery module according to claim 5, wherein the predetermined allowable value of the stress corresponds to a stress that breaks the outer wall of the container.

11. A battery module according to claim 1, wherein the stress caused in the outer wall of the container by the load is a stress caused adjacent to a junction between the partition and the outer wall of the container.

12. A battery module according to claim 2, wherein the stress caused in the outer wall of the container by the load is a stress caused adjacent to a junction between the partition and the outer wall of the container.

13. A battery module according to claim 3, wherein the stress caused in the outer wall of the container by the load is a stress caused adjacent to a junction between the partition and the outer wall of the container.

14. A battery module according to claim 4, wherein the stress caused in the outer wall of the container by the load is a stress caused adjacent to a junction between the partition and the outer wall of the container.

15. A battery module according to claim 5, wherein the stress caused in the outer wall of the container by the load is a stress caused adjacent to a junction between the partition and the outer wall of the container.

16. A closed type battery module comprising:
    a partition dividing an internal space of a closed container into a plurality of cells;
    a unit cell formed from the plurality of cells divided by the partition;
    a deformable portion that is provided in the partition and that deforms before a stress greater than a predetermined allowable value occurs in an outer wall of the container by a load applied to the container; and
    an electrolytic solution contained in the unit cell,
    wherein both sides of the deformable portion are in contact with the electrolytic solution.

* * * * *

UNITED STATES PATENT AND TRADEMARK OFFICE
CERTIFICATE OF CORRECTION

PATENT NO.    : 6,645,668 B2
DATED         : November 11, 2003
INVENTOR(S)   : Toyohiko Etou Page 1 of 1

It is certified that error appears in the above-identified patent and that said Letters Patent is hereby corrected as shown below:

<u>Title page,</u>
Item [73], Assignee, insert -- Toyota Jidosha Kabushiki Kaisha, Toyota-shi (JP) --
Item [30], Foreign Application Priority Data:

-- 2000-036381 --.

Signed and Sealed this

Twenty-eighth Day of September, 2004

JON W. DUDAS
*Director of the United States Patent and Trademark Office*